United States Patent
Lee et al.

(10) Patent No.: US 7,391,970 B2
(45) Date of Patent: Jun. 24, 2008

(54) APPARATUS AND METHOD FOR MONITORING OPTICAL SIGNAL-TO-NOISE RATIO

(75) Inventors: San-Liang Lee, Taipei (TW); Chun-Liang Yang, Sansing Township, Yilan County (TW); Pei-Min Gong, Jhonghe (TW); Dar-Zu Hsu, Sigang Township, Tainan County (TW); Ming-Hsiao Yang, Kaohsiung (TW); Yun-Lung Chou, Hsinchu (TW)

(73) Assignee: Industrial Technology Research Institute, Hsinchu (TW)

( * ) Notice: Subject to any disclaimer, the term of this patent is extended or adjusted under 35 U.S.C. 154(b) by 773 days.

(21) Appl. No.: 11/026,352

(22) Filed: Dec. 30, 2004

(65) Prior Publication Data

US 2006/0098980 A1 May 11, 2006

(30) Foreign Application Priority Data

Nov. 11, 2004 (TW) .............................. 93134467 A

(51) Int. Cl.
*H04B 10/08* (2006.01)
(52) U.S. Cl. .......................................... 398/26; 398/33
(58) Field of Classification Search .................. 398/26, 398/27, 28, 33, 158, 159; 356/73.1
See application file for complete search history.

(56) References Cited

U.S. PATENT DOCUMENTS

| | | | |
|---|---|---|---|
| 5,223,705 A | 6/1993 | Aspell et al. ................. 250/225 |
| 5,646,762 A * | 7/1997 | Delavaux et al. ............. 398/180 |
| 6,347,169 B1 | 2/2002 | Kang et al. .................... 385/24 |
| 6,396,051 B1 | 5/2002 | Li et al. ................... 250/227.18 |
| 6,396,574 B1 | 5/2002 | Lee et al. .................... 356/73.1 |
| 6,433,864 B1 | 8/2002 | Chung et al. ................ 356/73.1 |
| 2004/0114923 A1* | 6/2004 | Chung et al. ................... 398/26 |
| 2005/0232627 A1* | 10/2005 | Sun et al. ....................... 398/26 |

OTHER PUBLICATIONS

M. Rasztovits-Wiech et al., "Optical signal-to-noise ratio measurement in WDM networks using polarization extinction," ECOC '98, Sep. 1998, pp. 549-550.
J. H. Lee et al., "OSNR Monitoring Technique Using Polarization-Nulling Method," IEEE Photonics Technology Letters, vol. 13, No. 1, pp. 88-90, Jan. 2001.

(Continued)

*Primary Examiner*—M. R. Sedighian

(57) ABSTRACT

An apparatus and a method for monitoring optical signal-to-noise ratio are provided. It can be applied in dense wavelength-division multiplexed networks to monitor the transmission quality of each optical channel. The apparatus comprises an optical circulator, a tunable optical filter, a dithering signal, a dithered reflector, and two photodiodes. It can be integrated on a single chip. The invention utilizes the dithering and reflection functions of the dithered reflector, and passes the signal and the noise through the tunable optical filter once and twice, respectively. When the tunable optical filter is scanning and filtering the whole spectrum, the signal and noise powers are measured by the two photodiodes, respectively. The OSNR for each optical channel is then calculated according to the signal and noise powers. It can monitor channel location, wavelength drift, and OSNR by including a wavelength locker to act as an optical channel analyzer.

14 Claims, 9 Drawing Sheets

OTHER PUBLICATIONS

Chun-Liang Yang et al., "OSNR Monitoring Using Double-Pass Filtering and Dithered Tunable Reflector", IEEE Photonics Technology Letters. vol. 16, No. 6, Jun. 2004, P1570-P1572.

J. Chappell and S. DeMange, "Optical signal-to-noise ratio characterization demands precision and flexibility," WDM Solutions, vol. 2, No. 6, pp. 55-60, Nov. 2000.

C. Hentschel, D. M. Baney, J. Vobis, W. V. Sorin, L. Stokes, J. Beller, P. Hernday, C. M. Miller, V. McOmber, and S. W. Hinch, Fiber Optic Test and Measurement, D. Derickson, Ed., New Jersey: Prentice-Hall, 1998, pp. 101-115.

\* cited by examiner

APPARATUS AND METHOD FOR MONITORING OPTICAL SIGNAL-TO-NOISE RATIO

FIELD OF THE INVENTION

The present invention generally relates to an apparatus and a method for monitoring optical signal-to-noise ratio (OSNR), which can be applied in dense wavelength-division multiplexed (DWDM) communication systems.

BACKGROUND OF THE INVENTION

As information networks evolve rapidly, fiber optic networks become more and more important. The fiber optic network provides not only low transmission loss but also high transmission capacity. In a DWDM communication system, 16, 32, and even more channel wavelengths can be transmitted in a single optical fiber. In order to guarantee the quality of transmission signals in a fiber optic network system, it is necessary to effectively monitor optical power, optical wavelength, and OSNR. Wherein, the OSNR is the most important parameter to be monitored. The importance of the OSNR stems from the fact that it represents the degree of signal impairment after an optical signal is transmitted through an optical amplifier of an optical communication system. The attenuation and dispersion of an optical signal will affect the detectability of the optical signal. An amplified spontaneous emission (ASE) noise, which is first produced by an optical amplifier and then received by a receiver, may result in a significant reduction of the transmission efficiency of an optical communication system. In practical applications, the use of optical amplifiers may improve communication quality due to an enlargement of signal amplitude. However, the noise accompanied with the optical signal is amplified as well. The end result is a deterioration of the OSNR.

In order to accurately measure OSNR, it is required to carefully design a detector module. For example, conventional approaches using polarization rotators and linear polarizers or adopting various combinations of different optical filters to improve the accuracy of noise measurements have been proposed. However, the schemes that use polarization-selective components can be easily influenced by polarization fluctuation during signal transmission. For most optical filtering approaches, it is generally difficult to use a single tunable optical filter (TOF) for both optical signal power and noise power measurements.

In 2000, Chappel et al. ("Optical signal-to-noise ratio characterization demands precision and flexibility," WDM Solutions, vol. 2, no. 6, pp. 55-60, November 2000) proposed a method for accurately measuring the optical signal power and the noise power. The method requires an optical spectrum analyzer (OSA) with a wide enough resolution bandwidth (RBW) to accommodate an optical signal modulation sideband. Furthermore, the dynamic range of the OSA must be large enough to reject adjacent optical channels. As for the measurement of noise power, it can be performed by measuring two noise components at both sides of the optical channel in the optical spectrum. Then, the noise component mixed in the optical channel is obtained by an interpolation between the two measured noise components. Alternately, a dual sweep technique can be used for the OSNR measurement. This technique adopts an optical filter with a wide RBW to measure the optical signal power, and another optical filter with a narrow RBW to measure the noise power. Its drawback is an increase of the complexity due to the use of a dual sweep and the requirements of a wide RBW optical filter and a narrow RBW optical filter.

In 1998, Hentschel et al. ("Fiber Optic Test and Measurement", Prentice-Hall, 1998, pp. 101-115) applied a double-pass filtering technique to OSAs. The double-pass filtering technique was achieved by accurate tuning control of high-precision optical elements. Incoming and outgoing lights are directed to different trajectories for separate coupling. Though this technique is also adopted to increase the dynamic range of an OSA, it usually requires a sophisticated tuning control and optics. Besides, it occupies more space than that required for other techniques.

In business applications, Fabry-Pert etalon has been widely used in single wavelength distributed feedback lasers to control the wavelength. Therefore, its requirements of wavelength monitoring are not very strict. The location of each optical channel can be clearly identified by scanning and filtering the optical spectrum with a TOF. In DWDM networks, it is very important to maintain the quality of optical channel signals. And, effectively analyzing the quality of optical channel signals is a foundation for the maintenance of an optical communication system to guarantee the quality of the system.

The conventional techniques mentioned above for monitoring OSNR, a dual sweep technique and a double-pass filtering technique applied to OSAs, will result in an increase of both complexity and cost. The present invention provides an apparatus and a method for monitoring OSNR to not only lower the complexity and cost of the monitoring system but also increase the sensitivity of the monitoring system.

SUMMARY OF THE INVENTION

The present invention provides an apparatus and a method for monitoring OSNR, which overcomes the above mentioned drawbacks occurred in conventional OSNR monitoring techniques. The apparatus of the invention comprises an optical circulator, a TOF, a dithering signal source, a dithered reflector, and two photodiodes.

The present invention provides a technique that uses the reflection function of a dithered reflector to pass the optical signal through a TOF once and the noise through the TOF twice. The dithering function of the dithered reflector can increase the detection sensitivity and dynamic range of the two photodiodes. When the TOF is scanning and filtering the whole optical spectrum, the optical signal power and the noise power are simultaneously measured by the two photodiodes, respectively. The OSNR value of each optical channel is then calculated based on the measured data.

Moreover, the present invention adopts a dithering technique that imposes a dithering signal on the dithered reflector. The reflected dithered noise can be clearly separated from the residual reflected signal and the signal leaked from the optical circulator. Consequently, the accuracy of noise power measurement is maintained and high quality of OSNR monitoring is achieved.

According to the present invention, the method of monitoring OSNR comprises the following steps: (a) provides an optical signal to an optical circulator, (b) uses the optical circulator guiding the optical signal to a specified output trajectory, (c) uses a TOF to perform a single-pass filtering on said optical signal and then outputs the single-pass filtered optical signal to a dithered reflector, (d) imposes a dithering signal on the dithered reflector to dither the single-pass filtered optical signal and output the dithered signal to a first photodiode and the reflected dithered signal to the TOF, (e)

passes the reflected dithered signal through the TOF twice and output it to the optical circulator, (f) uses the optical circulator guiding the double-pass filtered optical signal through a specified output trajectory to a second photodiode, and (g) uses the first and the second photodiodes to measure the optical signal power and the noise power, respectively.

According to the present invention, the OSNR monitoring experiments with or without a dithering signal were performed on optical channels with bit rates of 2.5 Gbps and 10 Gbps. The OSNR values measured with the apparatus of this invention are then compared with reference values measured with an OSA. The results indicate that the error increases rapidly as the number of optical channels and the OSNR value increase when a dithering signal is not adopted. When a dithering signal is applied, the measurable OSNR values range from 10 to 44 dB and the error is less than 0.4 dB. At present, the measurable OSNR value is limited by the maximal OSNR value that can be generated by the experimental equipments used in the invention.

The present invention can be applied in DWDM networks to monitor the transmission quality of each optical channel. The important parameters to be monitored include optical channel position, wavelength drift, OSNR etc. The fact that the whole monitoring module can be integrated on a single chip makes it even more attractive. And, its potential for new applications in the future becomes enormous.

The foregoing and other objects, features, aspects and advantages of the present invention will become better understood from a careful reading of a detailed description provided herein below with appropriate reference to the accompanying drawings.

DETAILED DESCRIPTION OF THE PREFERRED EMBODIMENTS

The present invention improves the method of OSNR measurement proposed by Chappell. In Chappell's method, two different filters are used alternately. One filter with a wide enough RBW to accommodate the signal spectrum is adopted for measuring optical signal power. Another filter with a narrow enough RBW to reject adjacent optical channels is adopted for measuring noise power.

Figure 1:
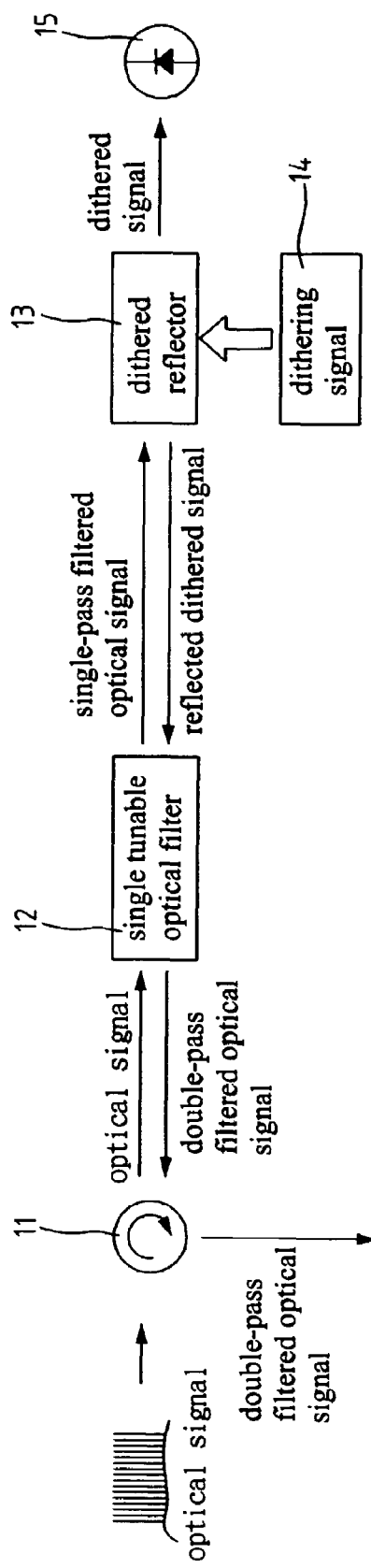
FIG. 1 is a block diagram of an optical signal-to-noise ratio monitoring apparatus according to the present invention.

FIG. 1 is a block diagram of an OSNR monitoring apparatus according to the present invention. Referring to FIG. 1, the OSNR monitoring apparatus of the present invention comprises an optical circulator 11, a TOF 12, a dithering signal 14, a dithered reflector 13, and two photodiodes 15 and 16. The optical circulator 11 has a circular transmission function, which guides input signals from a communication system to a specified output trajectory. The TOF 12 has a bidirectional filtering function, which receives a signal (for example, DWDM signal) from optical circulator 11 and outputs a single-pass filtered optical signal after performing a first-pass filtering. Each incoming signal is scanned, filtered, and analyzed by the TOF to identify its location in the optical spectrum and to measure its amplitude.

The dithered reflector 13 has reflection and dithering functions, which receives and dithers the single-pass filtered signal from the TOF 12 and then outputs a transparent dithered signal and a reflected dithered signal. The two photodiodes are the first photodiode 15 and the second photodiode 16, respectively. The first photodiode 15 receives the transparent dithered signal and measures its optical signal power. The TOF 12 receives again the reflected dithered signal from the dithered reflector 13, and outputs a double-pass filtered optical signal after performing a second-pass filtering. The optical circulator 11 guides the incoming double-pass filtered optical signal to a specified output trajectory. The second photodiode 16 receives the double-pass filtered optical signal from the optical circulator 11 and measures its noise power. The OSNR value for each optical channel is then calculated based on the measured powers.

The main design of the present invention is to pass optical signals through an optical filter once and optical noises through the optical filter twice. The present invention adopts a simple hardware setup to achieve the noise power measurement through effective narrowing of filter bandwidth.

On the other hand, the present invention adopts an optical circulator to distinguish optical signals coming from different directions. The optical circulator is used to guide the signals, which are the opposite direction to the original optical signals, to another optical trajectory. It is commonly adopted in a bidirectional transmission.

Figure 2:
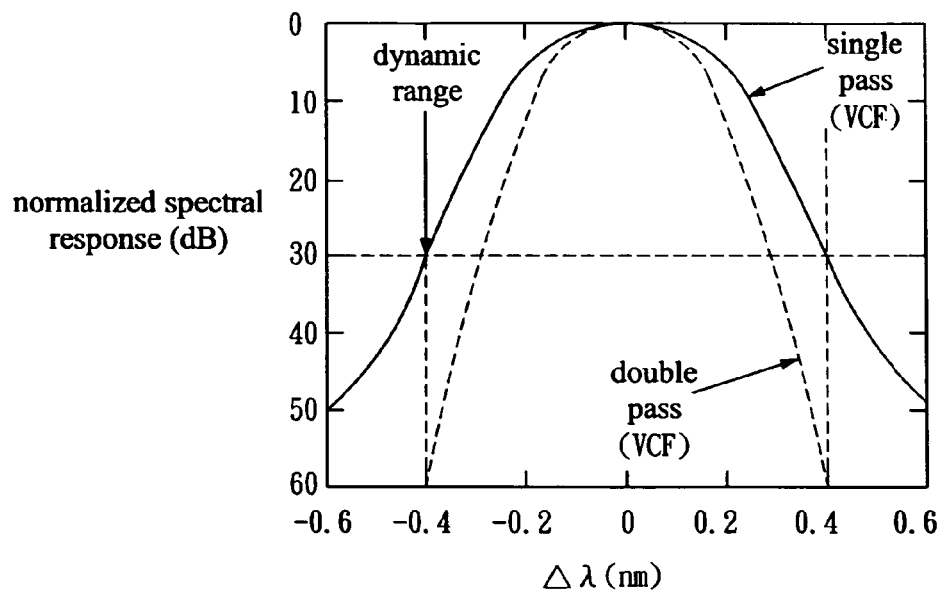
FIG. 2 shows a single-pass and a double-pass normalized spectral responses of a TOF.

FIG. 2 shows a single-pass and a double-pass normalized spectral responses of a TOF. In terms of optical characteristics, an outgoing double-pass filtered optical signal from the TOF 12 is equivalent to an optical signal which has passed through two similar TOFs. Referring to FIG. 2, the dynamic ranges of a single-pass filtering and a double-pass filtering at optical spectra of ±0.4 nm are 30 dB and 60 dB, respectively. The double-pass filtering results in a higher rejection ratio to the optical channels located out of the ±0.4 nm range than the single-pass filtering. Therefore, the double-pass filtering is suitable for noise power measurement. The present invention is especially advantageous for monitoring channels of dense spacings.

Figure 3:
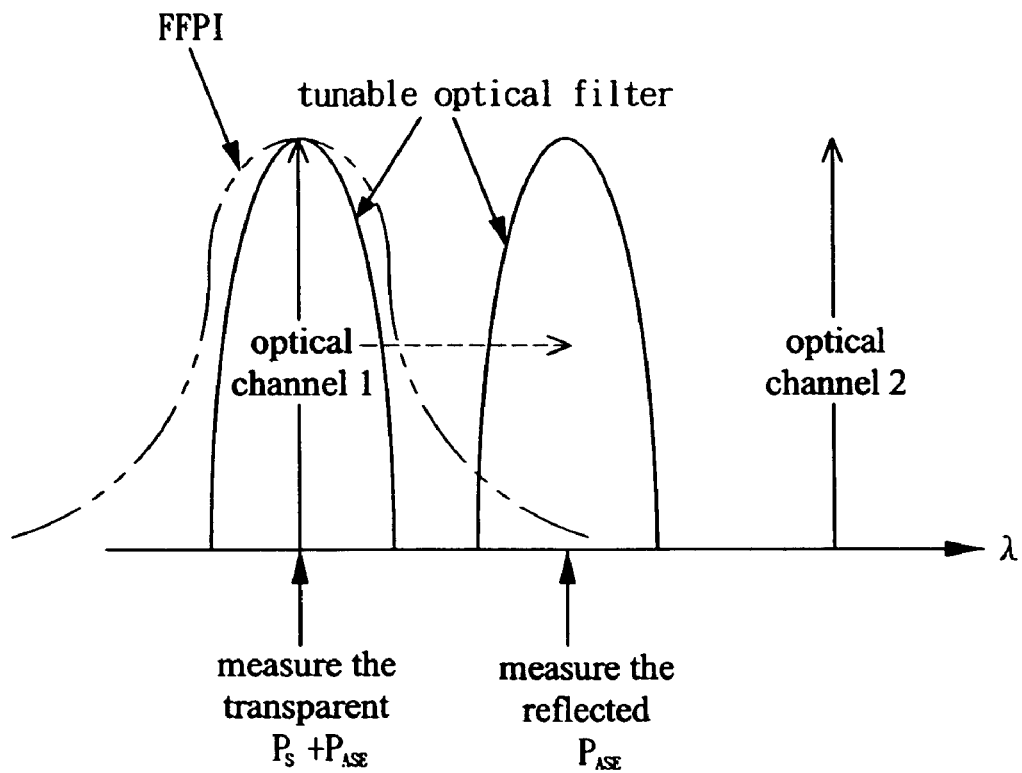
FIG. 3 shows transmission responses of a TOF and a dithered reflector during optical signal power and noise power measurements.

FIG. 3 depicts transmission responses of a TOF and a dithered reflector during optical signal power ($P_S$) and noise power ($P_{ASE}$) measurements. The TOF 12 is aligned to the optical channel position during an optical signal power measurement. The TOF 12 is aligned to the middle of two adjacent optical channels during a noise power measurement. The optical signal power is measured at the output terminal of the dithered reflector 13 (i.e., measured by photodiode 15), and the noise power is measured at the output terminal of the optical circulator 11 (i.e., measured by photodiode 16). It's worth to mention that the dithered reflector 13 is locked on the filtering position of the TOF during an optical signal power measurement (i.e., optical channel position such as optical channel 1). However, the dithered reflector 13 stays in the original optical channel position during a noise power measurement (i.e., optical channel 1).

According to the present invention, a single-pass filtered optical signal is used for optical signal power measurement and a double-pass filtered optical signal reflected from dithered reflector 13 is used for noise power measurement. During the noise power measurement, the adjacent optical channels signals are effectively suppressed to reduce the interference. The present invention uses the reflective function of a dithered reflector 13 to achieve a double-pass filtering which resolves potential problems arising from unwanted residual signal reflection and circulator leakage. These problems will affect the accuracy of noise measurement. Though the return loss of a normal TOF is greater than 40 dB, the accuracy of noise measurement can still be affected. Especially when there are dense optical channels at large OSNR conditions where the optical signal power is much greater than the noise power, a tiny reflection of residual signal or circulator leakage will strongly affect the results of a noise measurement. The present invention adopts a dithering technique that imposes a dithering signal 14 on a dithered reflector 13. The reflected dithered noise can be clearly separated from the reflected residual signal and the leaked signal from the optical circulator. Consequently, the above mentioned problem is resolved easily.

To demonstrate the visual ability of the present invention, an experiment is performed on a monitoring module with commercially available components. These components include a voltage-controlled filter (VCF) made by JDSU and a fiber Fabry-Perot interferometer (FFPI) made by MOI. Wherein the FFPI is used as a dithered reflector. The spectral response of the VCF is shown in FIG. 2. The bandwidth and finesse of the FFPI are 24.9 GHz and 195, respectively. Three distributed feedback lasers are used to generate DWDM channels with a spacing of 100 GHz. Dithering signals with a nonretum to zero code and bit rates of 2.5 Gbps and 10 Gbps, respectively, are performed on the optical channels. The DWDM channels signals are amplified by an Erbium-doped fiber amplifier (EDFA) to generate signals of different OSNRs.

Figure 4:
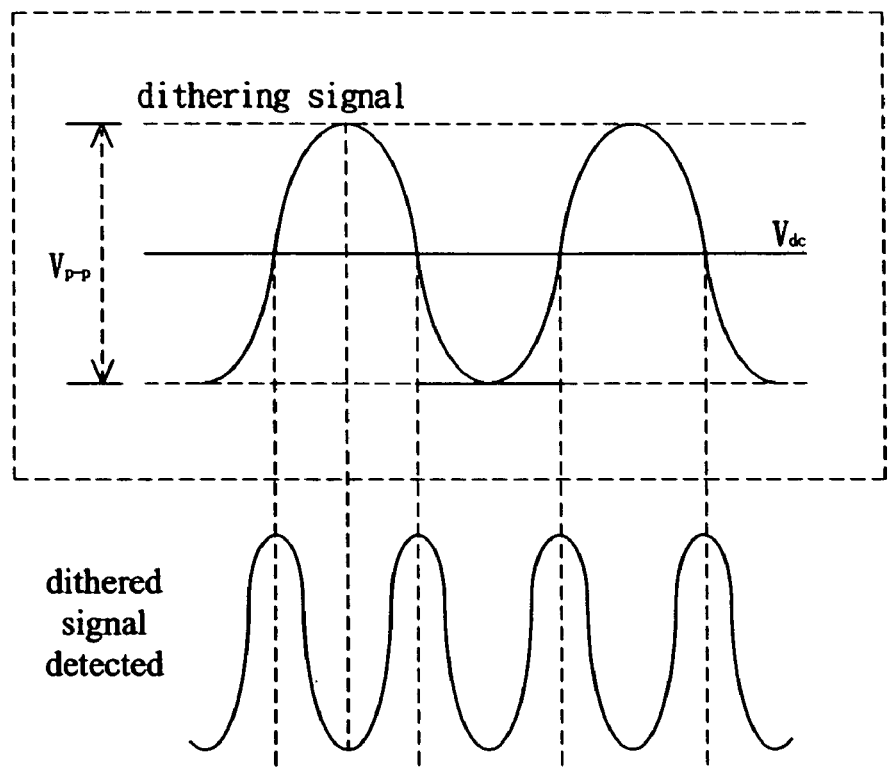
FIG. 4 shows a dithering signal for a dithered reflector and a dithered signal detected by a first photodiode.

FIG. 4 depicts a dithering signal for the dithered reflector (i.e., FFPI) and a dithered signal detected by the first photodiode. Referring to FIG. 4, the reflectivity of the dithered reflector is modulated by a dithering signal (2.5 KHz) imposes on the dithered reflector. Consequently, the dithered noise that is reflected from the FFPI can be detected and separated from the non-dithered residual signals. As can be seen in this figure, the output signal is maximal at the middle of the dithering signal. Therefore, both the dithered signal (5 KHz) detected by the first photodiode 15 and the reflected dithered noise (5 KHz) detected by the second photodiode 16 occur at twice the dithering frequency (2.5 KHz). In addition to the dithering signal, the signals used to control the dithered reflector further includes a dc voltage (Vdc) to scan and track the channel position. The signal power is measured by the first photodiode 15 at the peak value of the signal of the first photodiode 15, while the noise power is measured by the second photodiode 16 as the TOF is aligned to the middle of two adjacent optical channels. Based on the above scheme, the maximal OSNR value that can be monitored is determined by the spectral response of the TOF.

Figure 5A:
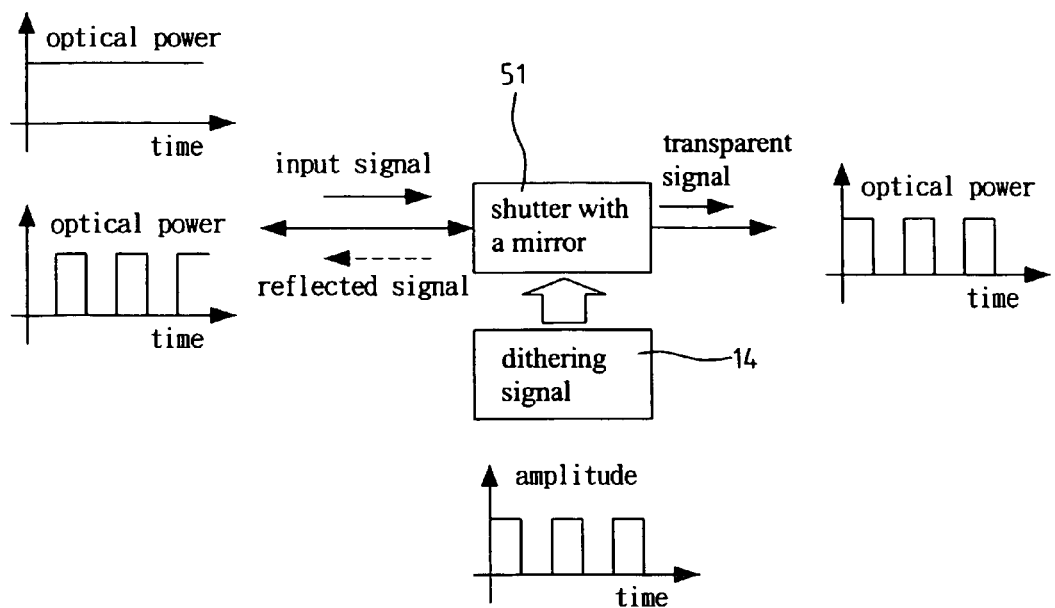
FIG. 5A shows a dithered reflector with an optical shutter and a mirror.
Figure 5B:
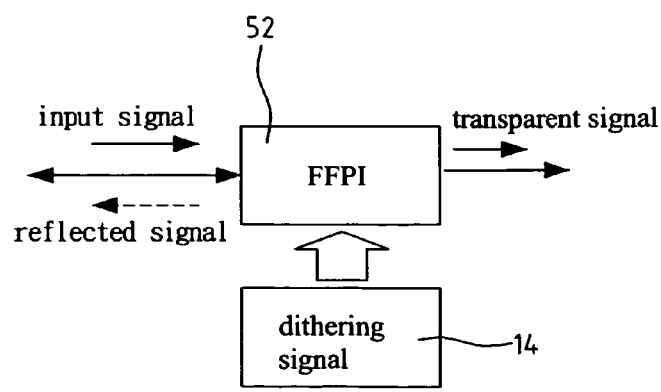
FIG. 5B shows a dithered reflector with a Fabry-Pert interferometer.
Figure 5C:
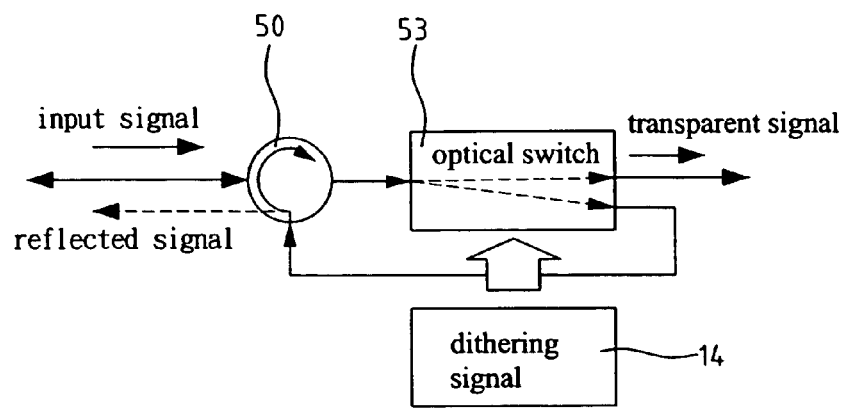
FIG. 5C shows a dithered reflector with an optical circulator and an optical switch.
Figure 5D:
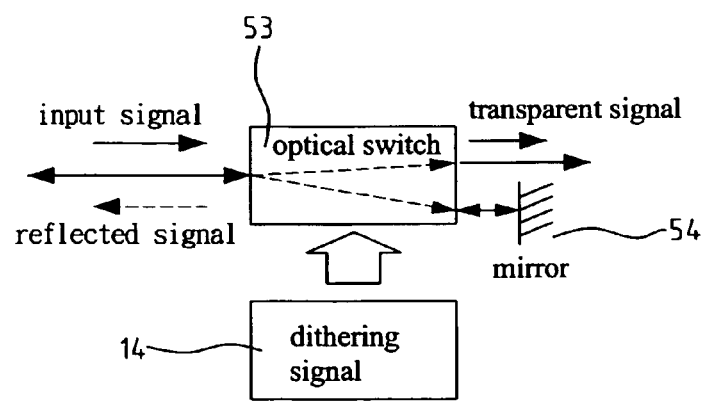
FIG. 5D shows a dithered reflector with an optical switch and a mirror.

According to the present invention, the best setup for a dithered reflector comprises a shutter 51 with a mirror, as shown in FIG. 5A. The operation principle of the dithered reflector is to allow the input signal passing through the shutter when the dithering signal is ON. On the other hand, the input signal is totally reflected by the mirror of the shutter when the dithering signal is OFF. Therefore, the input signal is modulated by the dithering signal through the ON/OFF control of the shutter. This explains the functions of the above mentioned dithered reflector and its setup. Besides the setup described in FIG. 5A, an FFPI 52 is another kind of setup for a dithered reflector as shown in FIG. 5B. There are other kinds of setups as described below. FIG. 5C shows a dithered reflector with an optical circulator and an optical switch. Wherein an optical circulator 50 and an optical switch 53 form a dithered reflector. FIG. 5D shows a dithered reflector with an optical switch and a mirror. Wherein an optical switch 53 and a mirror 54 form a dithered reflector.

Figure 6:
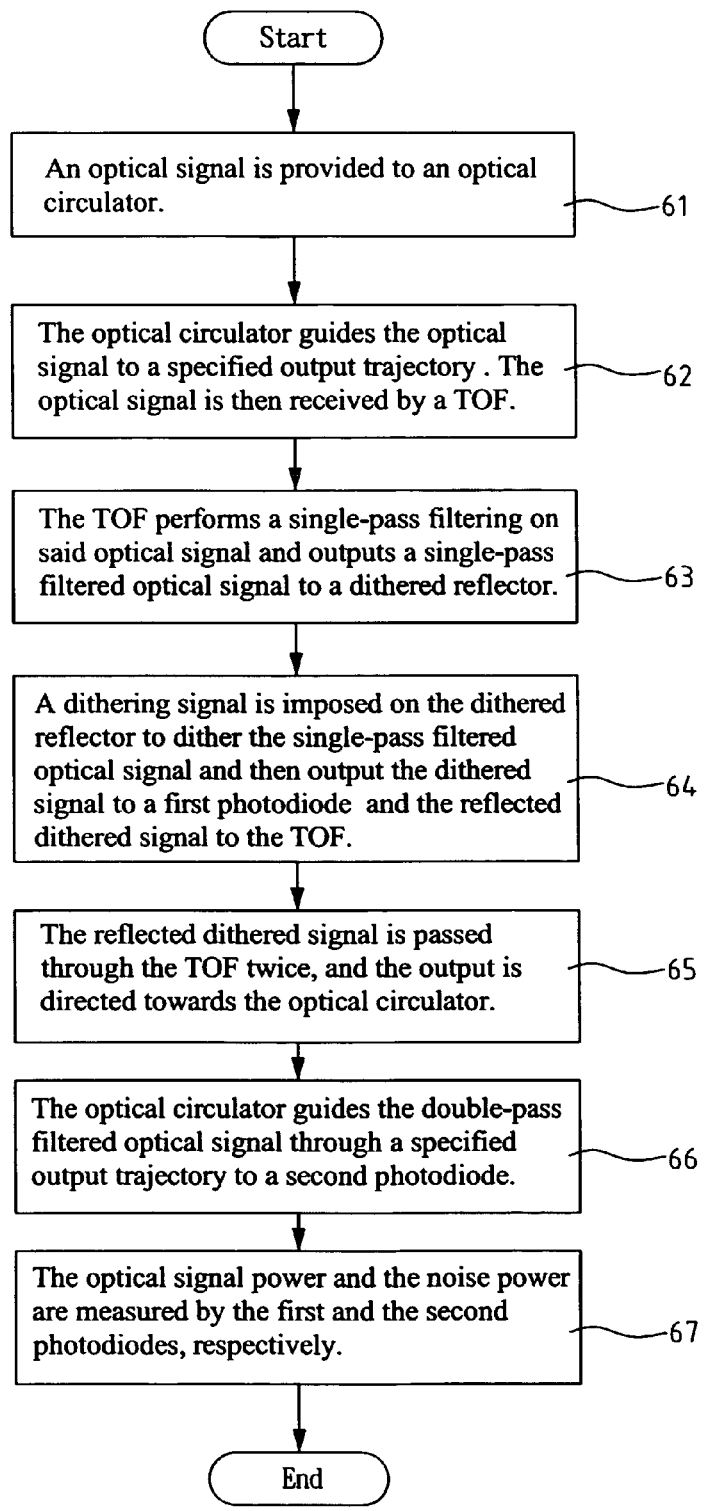
FIG. 6 shows the flow of a method for monitoring OSNR according to the present invention.

FIG. 6 shows the flow of a method for monitoring OSNR according to the present invention. Referring to FIGS. 1 and 6, the OSNR monitoring method of the present invention is described below.

Firstly, in step 61, an optical signal is provided to an optical circulator 50. In step 62, the optical circulator 50 guides the optical signal to a specified output trajectory. The optical signal is then received by a TOF 12. In step 63, the TOF 12 performs a single-pass filtering on said optical signal and outputs a single-pass filtered optical signal to a dithered reflector 13. In step 64, a dithering signal 14 is imposed on the dithered reflector 13 to dither the single-pass filtered optical signal and then output the dithered signal to a first photodiode 15 and the reflected dithered signal to the TOF 12. In step 65, the reflected dithered signal is passed through the TOF 12 twice, and the output is directed towards the optical circulator 50. In step 66, the optical circulator 50 guides the double-pass filtered optical signal through a specified output trajectory to a second photodiode 16. Lastly, in step 67, the optical signal power and the noise power are measured by the first and the second photodiodes, respectively.

In step 64, the dithered signal and the reflected dithered signal are modulated by the dithering signal 14 through the ON/OFF control of a shutter 51 (as shown in FIG. 5A). The shutter 51 has a mirror. The dithering signal 14 is imposed on the single-pass filtered optical signal to achieve dithering and reflection functions when the single-pass filtered optical signal is input to the shutter.

Furthermore, in step 64, the dithered signal and the reflected dithered signal can be modulated by the dithering signal 14 through the use of an optical circulator 50 and an optical switch 53. Wherein, the dithering and reflection functions are achieved by flipping the optical switch 53. The optical switch 53 is controlled by the dithering signal 14 imposed on the single-pass filtered optical signal when the single-pass filtered optical signal is input to the optical circulator 50. Similarly, in step 64, the dithered signal and the reflected dithered signal can be modulated by the dithering signal 14 through the use of an optical switch 53 and a mirror 54. Wherein, the dithering and reflection functions are achieved by flipping the optical switch 53. The optical switch 53 is controlled by the dithering signal 14 imposed on the single-pass filtered optical signal when the single-pass filtered optical signal is inputted to the optical switch 53.

In step 67, the signal power is measured by the first photodiode 15 at the peak value of the signal of the first photodiode 15. The noise power is measured by the second photodiode 16 when the signal of the first photodiode 15 reaches a minimum.

Figure 7A:
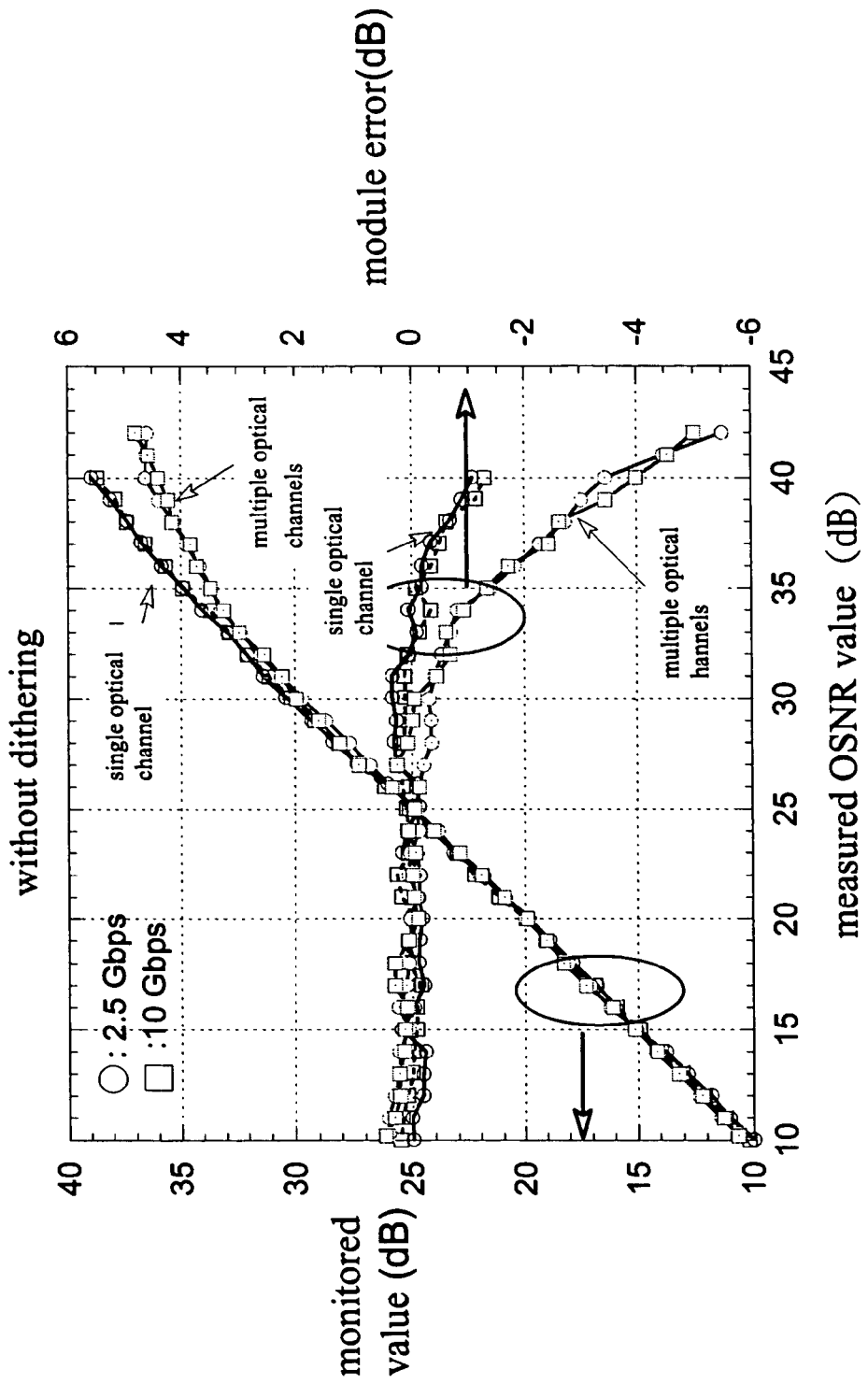
FIG. 7A shows a comparison of measured OSNR monitoring results of the present invention with those of an optical spectrum analyzer for bit rates of 2.5 and 10 Gbps without dithering for one or three optical channel.
Figure 7B:
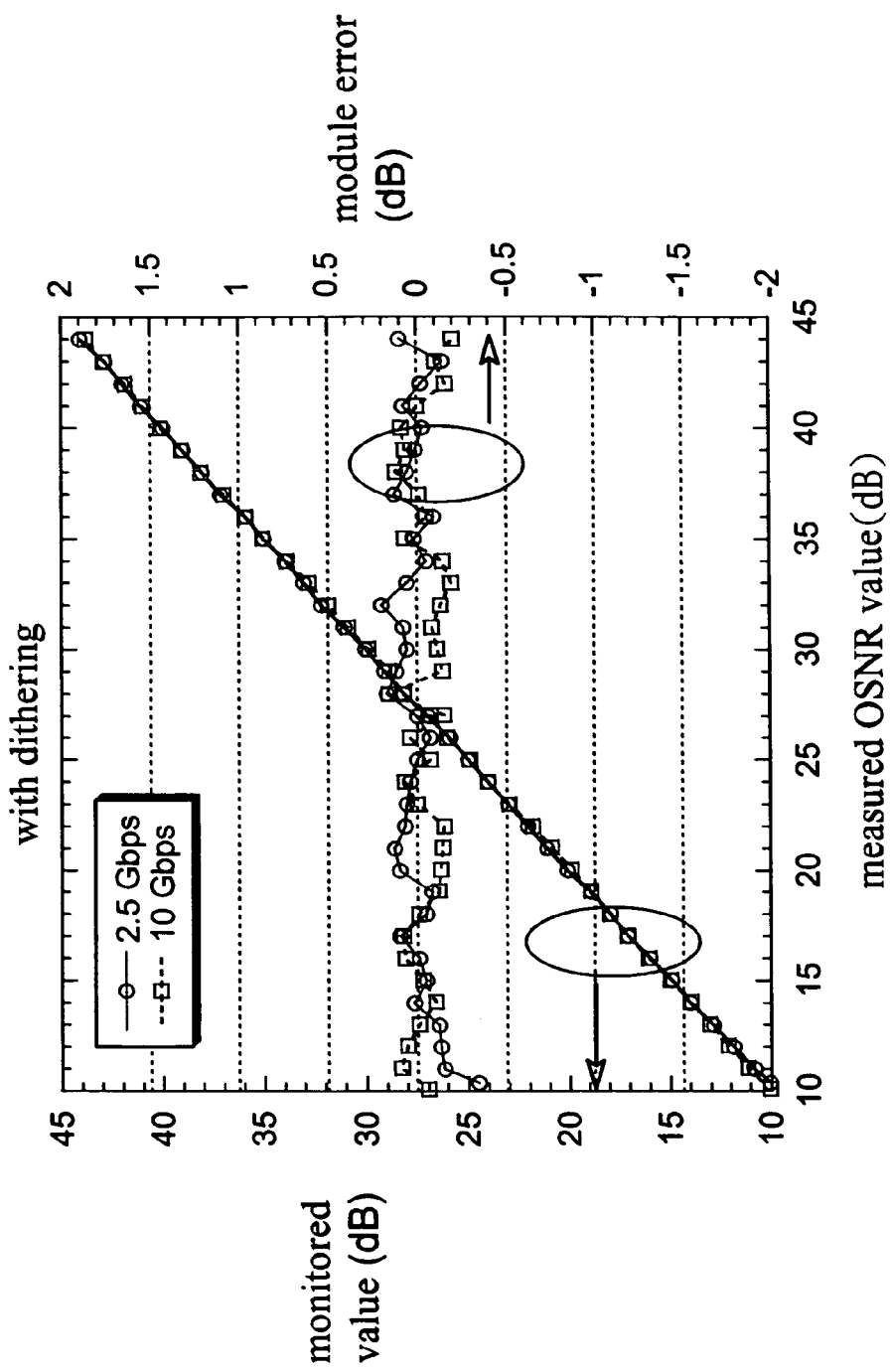
FIG. 7B shows a comparison of measured OSNR monitoring results of the present invention with those of an optical spectrum analyzer for bit rates of 2.5 and 10 Gbps with dithering for three optical channels.

FIG. 7A depicts a comparison of measured OSNR monitoring results of the present invention with those of an OSA for bit rates of 2.5 and 10 Gbps without dithering for one or three optical channel. FIG. 7B shows a comparison of measured OSNR monitoring results of the present invention with those of an OSA for bit rates of 2.5 and 10 Gbps with dithering for three optical channels.

Referring to FIG. 7A which shows a comparison of measured OSNR monitoring results of the present invention with those of a high-performance OSA (RBW=0.1 nm), the OSNR monitoring results without dithering can only be measured up to 31 dB with less than 0.5 dB error. For three-channel input, the error increases considerably as the input OSNR is larger than 30 dB. The OSNR monitoring error is found to increase rapidly with an increase of channel number and OSNR value. This limitation can be significantly improved by dithering the dithered reflector (i.e., FFPI). As shown in FIG. 7B, the error is less than 0.4 dB for three channels with dithering over OSNR values between 10 and 44 dB. As can be seen from the spectral response of a VCF (e.g., FIG. 2), the present invention can be applied to monitor OSNR values beyond 44 dB. At present, the measurable OSNR value is limited by the maximal OSNR value that can be generated by the experimental equipments used in the invention.

The present invention can be applied in DWDM networks to monitor the transmission quality of each optical channel. It also has the advantage of integrating the whole monitoring module on a single chip. In addition, it can be used as an optical channel analyzer to monitor important parameters, such as optical channel position, wavelength drift, OSNR etc., when works with a wavelength locker.

Although the present invention has been described with reference to the preferred embodiments, it will be understood that the invention is not limited to the details described thereof. Various substitutions and modifications have been suggested in the foregoing description, and others will occur to those of ordinary skill in the art. Therefore, all such substitutions and modifications are intended to be embraced within the scope of the invention as defined in the appended claims.

What is claimed is:

1. An apparatus for monitoring optical signal-to-noise ratio (OSNR), comprising:
   an optical circulator guiding an input optical signal to a specified output trajectory;
   a tunable optical filter (TOF) receiving said optical signal output from said optical circulator, and then outputting a filtered optical signal after performing a first-pass filtering on said optical signal;
   a dithering signal;
   a dithered reflector receiving and dithering said single-pass filtered optical signal according to said dithering signal, and then outputting a dithered signal and a reflected dithered signal; and
   two photodiodes being a first photodiode and a second photodiode, said first photodiode receives said dithered signal and measures signal power;
   wherein said TOF receives said reflected dithered optical signal, and then outputs a double-pass filtered optical signal after performing a second-pass filtering on said reflected dithered optical signal, said optical circulator guides said double-pass filtered optical signal from said TOF to a specified output trajectory, said second photodiode receives said double-pass filtered optical signal from said optical circulator and measures noise power.

2. The apparatus for monitoring OSNR as claimed in claim 1, wherein said dithered reflector is a shutter with a mirror.

3. The apparatus for monitoring OSNR as claimed in claim 1, wherein said dithered reflector is a Fabry-Pert interferometer.

4. The apparatus for monitoring OSNR as claimed in claim 1, wherein said dithered reflector comprises an optical circulator and an optical switch.

5. The apparatus for monitoring OSNR as claimed in claim 1, wherein said dithered reflector comprises an optical switch and a mirror.

6. The apparatus for monitoring OSNR as claimed in claim 1, wherein the frequency of said dithered signal and said reflected dithered signal is twice the frequency of said dithering signal.

7. The apparatus for monitoring OSNR as claimed in claim 1, wherein said apparatus is packaged and then integrated on a single chip.

8. The apparatus for monitoring OSNR as claimed in claim 1, wherein said apparatus is combined with a wavelength locker to form an optical channel analyzer.

9. A method for monitoring OSNR, comprising the steps of:
   (a) providing an optical signal to an optical circulator;
   (b) using said optical circulator to guide said optical signal to a specified output trajectory, and said output trajectory goes to an input terminal of a tunable optical filter (TOF);
   (c) using said TOF to perform a single-pass filtering on said optical signal, said single-pass filtered optical signal is then output to a dithered reflector,
   (d) imposing a dithering signal on said dithered reflector to dither said single-pass filtered optical signal and output said dithered signal to a first photodiode and said reflected dithered signal to said TOF;
   (e) performing a double-pass filtering by passing said reflected dithered signal through said TOF twice, and outputting said double-pass filtered optical signal to said optical circulator;
   (f) using said optical circulator to guide said double-pass filtered optical signal through a specified output trajectory to a second photodiode; and
   (g) using said first and said second photodiodes to measure the optical signal power and the noise power, respectively.

10. The method for monitoring OSNR as claimed in claim 9, wherein the signal power is measured by said first photodiode at the peak value of the signal of said first photodiode.

11. The method for monitoring OSNR as claimed in claim 9, wherein the noise power is measured by said second photodiode when the signal of said first photodiode reaches a minimum.

12. The method for monitoring OSNR as claimed in claim 9, wherein in step (d) said dithered signal and said reflected dithered signal are modulated by said dithering signal through the ON/OFF control of a shutter, said shutter has a mirror, said dithering signal is imposed on said single-pass filtered optical signal to achieve dithering and reflection functions when said single-pass filtered optical signal is input to said shutter.

13. The method for monitoring OSNR as claimed in claim 9, wherein in step (d) said dithered signal and said reflected dithered signal are modulated by said dithering signal through the use of an optical circulator and an optical switch, the dithering and reflection functions are achieved by flipping said optical switch, said optical switch is controlled by said dithering signal imposed on said single-pass filtered optical signal when said single-pass filtered optical signal is input to said optical circulator.

14. The method for monitoring OSNR as claimed in claim 9, wherein in step (d) said dithered signal and the reflected dithered signal are modulated by said dithering signal through the use of an optical switch and a mirror, the dithering and reflection functions are achieved by flipping said optical switch, said optical switch is controlled by said dithering signal imposed on said single-pass filtered optical signal when said single-pass filtered optical signal is input to said optical switch.

\* \* \* \* \*